(12) United States Patent
Sennett et al.

(10) Patent No.: US 8,761,792 B2
(45) Date of Patent: Jun. 24, 2014

(54) MANAGEMENT OF PREEMPTABLE COMMUNICATIONS RESOURCES

(75) Inventors: DeWayne Allan Sennett, Redmond, WA (US); Brian Kevin Daly, Peachtree Corners, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1351 days.

(21) Appl. No.: 12/057,007

(22) Filed: Mar. 27, 2008

(65) Prior Publication Data

US 2009/0247205 A1 Oct. 1, 2009

(51) Int. Cl.
*H04W 72/00* (2009.01)

(52) U.S. Cl.
USPC .............. 455/454; 455/404.1; 455/435.3; 455/452.1; 455/512

(58) Field of Classification Search
USPC ............ 455/404.1, 405, 408, 450, 455, 454
See application file for complete search history.

(56) References Cited

U.S. PATENT DOCUMENTS

| | | | | |
|---|---|---|---|---|
| 5,101,502 A * | 3/1992 | Felderman et al. | | 455/509 |
| 5,742,904 A * | 4/1998 | Pinder et al. | | 455/404.1 |
| 6,067,457 A * | 5/2000 | Erickson et al. | | 455/512 |
| 6,141,322 A * | 10/2000 | Poretsky | | 370/231 |
| 6,374,099 B1 * | 4/2002 | Bi et al. | | 455/404.1 |
| 6,385,458 B1 * | 5/2002 | Papadimitriou et al. | | 455/456.2 |
| 6,477,373 B1 * | 11/2002 | Rappaport et al. | | 455/436 |
| 6,745,043 B1 * | 6/2004 | Lester et al. | | 455/512 |
| 7,003,303 B2 * | 2/2006 | Khawand et al. | | 455/452.1 |
| 7,035,241 B2 * | 4/2006 | Struhsaker | | 370/338 |
| 7,206,593 B1 * | 4/2007 | Yarkosky et al. | | 455/517 |
| 7,330,710 B1 * | 2/2008 | Xu et al. | | 455/404.1 |
| 7,558,588 B2 * | 7/2009 | To et al. | | 455/512 |
| 7,606,593 B1 * | 10/2009 | Vu | | 455/527 |
| 7,616,746 B2 * | 11/2009 | O'Neill | | 379/114.01 |
| 7,703,102 B1 * | 4/2010 | Eppstein et al. | | 718/104 |
| 7,747,269 B2 * | 6/2010 | Brewer et al. | | 455/518 |
| 7,783,316 B1 * | 8/2010 | Mitchell | | 455/521 |
| 7,844,290 B2 * | 11/2010 | Park | | 455/512 |
| 7,912,472 B2 * | 3/2011 | Beziot et al. | | 455/450 |
| 2002/0065063 A1 * | 5/2002 | Uhlik et al. | | 455/404 |
| 2003/0093789 A1 * | 5/2003 | Zimmerman et al. | | 725/34 |
| 2003/0223431 A1 * | 12/2003 | Chavez et al. | | 370/395.42 |
| 2005/0260948 A1 * | 11/2005 | Regulinski et al. | | 455/12.1 |
| 2006/0056291 A1 * | 3/2006 | Baker et al. | | 370/229 |
| 2006/0083205 A1 * | 4/2006 | Buddhikot et al. | | 370/338 |
| 2006/0212588 A1 * | 9/2006 | Haner et al. | | 709/229 |
| 2006/0270413 A1 * | 11/2006 | Matteo et al. | | 455/450 |

(Continued)

OTHER PUBLICATIONS

National Telecommunications and Information Administration, U.S. Spectrum Management Policy: Agenda for the future [online], Sep. 3, 1998 [retrieved on Jan. 14, 2013]. Retrieved from the Internet<URL: http://www.ntia.doc.gov/report/1998/us-spectrum-management-policy-agenda-future > Chapter 3, 1. Dynamic Sharing).*

*Primary Examiner* — German J Viana Di Prisco

(74) *Attorney, Agent, or Firm* — Baker & Hostetler LLP

(57) ABSTRACT

In a communications spectrum shared by public safety users and commercial users, in the event of an emergency condition, commercial users are preempted and corresponding resources are reallocated to authorized public safety users. When the emergency condition subsides, the reallocated resources are again made available for commercial use. In an example configuration, resources and associated attributes including preemptability status are maintained in a Base Station Controller (BSC), Radio Network Controller (RNC), and/or Radio Resource Control (RRC) of a communications network.

18 Claims, 6 Drawing Sheets

(56) References Cited

U.S. PATENT DOCUMENTS

| | | | |
|---|---|---|---|
| 2007/0004421 A1* | 1/2007 | Chambers et al. | 455/450 |
| 2007/0206533 A1* | 9/2007 | Wiatrowski et al. | 370/329 |
| 2008/0076421 A1* | 3/2008 | Schwarz | 455/435.3 |
| 2008/0108365 A1* | 5/2008 | Buddhikot et al. | 455/452.1 |
| 2008/0222019 A1* | 9/2008 | Stanforth et al. | 705/37 |
| 2009/0143046 A1* | 6/2009 | Smith | 455/404.1 |
| 2009/0215457 A1* | 8/2009 | Wang et al. | 455/435.1 |
| 2009/0232091 A1* | 9/2009 | Khan | 370/331 |

* cited by examiner

MANAGEMENT OF PREEMPTABLE COMMUNICATIONS RESOURCES

TECHNICAL FIELD

The technical field generally relates to communications systems and more specifically relates to the allocation of communications resources for public safety applications.

BACKGROUND

When television broadcasts convert from analog format to digital format, a portion of the spectrum currently utilized in conjunction with the analog format will become available. Some of the available spectrum will be reserved for commercial use and some of the available spectrum will be reserved for public safety use. In some cases however, when the need for public safety use increases (e.g., natural disaster, police activity, etc.), contention for use of the shared spectrum may exist between the commercial services and public safety.

SUMMARY

Communications resources are managed such that some of the resources are preemptable for public safety use. Channels within a designated, shared, spectrum are allocated with an indication of preemptability status. In an example embodiment, the shared spectrum is shared by public safety users and commercial users. Under certain conditions, the public safety users can preempt use of the shared spectrum by commercial users. For example, a public safety user can preempt a commercial user in the event of an emergency condition. Accordingly, when a commercial user initiates a call and/or session to utilize the shared spectrum, the channel, or channels, allocated to the commercial user comprises an indication as to the preemptability of the allocated channel (e.g., an indication if the channel is preemptable or not preemptable). If an emergency condition or the like arises, the indication of preemptability status is utilized to preempt the commercial user if the channel is preemptable. When the emergency condition subsides, the usage of the preempted channel is reverted back to the appropriate user.

In an example configuration, a database of communications resources is maintained in a Base Station Controller (BSC) and/or a Radio Resource Control (RRC) of a wireless communications network. Each resource is maintained with an indication as to whether the resource is preemptable or not preemptable. When a request is received by the BSC/RNC/RRC to obtain a communications resource for the requester, the BSC/RNC/RRC determines the appropriate resource (e.g., channel) and makes it available to the requester. Information about the selected resource, including its indication of preemptability status is provided to a call/session controller such as a Mobile Switching Center (MSC) for voice and/or a Service GPRS Support Node (SGSN) for data. If the resource is preemptable, the requester also can be provided an indication that the resource is preemptable. In the event of an emergency or the like, if the resource is preemptable and if the resource is needed, the call/session controller will preempt the resource for use during the emergency. When the emergency condition has been addressed and the need for additional resources is no longer needed, the call/session controller provides access to the resource back to the previous user and the BSC/RNC/RRC updates the list of preemptable resources.

BRIEF DESCRIPTION OF THE DRAWINGS

The foregoing and other objects, aspects and advantages of managing preemptable communications resources will be better understood from the following detailed description with reference to the drawings.

DETAILED DESCRIPTION OF ILLUSTRATIVE EMBODIMENTS

It is expected that in the year 2008, as a result of the conversion of analog television broadcast to digital television broadcast, communications spectrum will become available. The communications spectrum is expected to be made available as a shared spectrum for commercial users and public safety users. As described herein, utilization of this shared spectrum by commercial users can be preempted by public safety users in the case of an emergency event or the like. In an example configuration, the shared spectrum comprises a 10 MHz band centered abut 700 MHz, and public safety users will be allocated half of the shared spectrum and commercial users will allocated the other half of the shared spectrum (e.g., 5 MHz each). When authorized public safety users need additional spectrum beyond their normal levels due to emergency conditions, the authorized public safety users can utilize the commercial side of the shared spectrum and can preempt commercial usage. In the case of an event, such as an emergency or the like, which requires the public safety users to utilize more of the spectrum, additional bandwidth will be reallocated to the public safety users to respond to the event. The additional bandwidth will be reallocated in accordance with an indication of preemptability status associated with resources needed to allocate the additional bandwidth. When the event or need for additional bandwidth subsides, the reallocated bandwidth will be made available for use by the preempted user, or other appropriate user. In various configurations, an authorized public safety user will be able to preempt other public safety users having lower priorities, as well as preempt commercial users.

Public safety users can comprise any appropriate users such as, for example, law enforcement personnel, medical personnel, first responders, National Weather Service personnel, or the like. Commercial users can comprise any appropriate commercial users such as, for example, general public consumers and enterprise customers. For illustrative purposes, in an example scenario, a public user can be a paramedic providing medical assistance to a patient. The paramedic may need additional bandwidth to provide telemetric and voice date to a hospital in order to provide medical services to the patient. A commercial user could be preempted from using the shared spectrum and the preempted resources would be reallocated to the paramedic. When the paramedic no longer needs the additional resources to transmit the telemetric data, the reallocated resources can be reverted back to the commercial user.

It is to be understood that the herein described management of preemptable communications resources is not limited to public safety users and commercial users. Rather, the herein described management of preemptable communications resources is applicable to any number and type of users.

Figure 1:
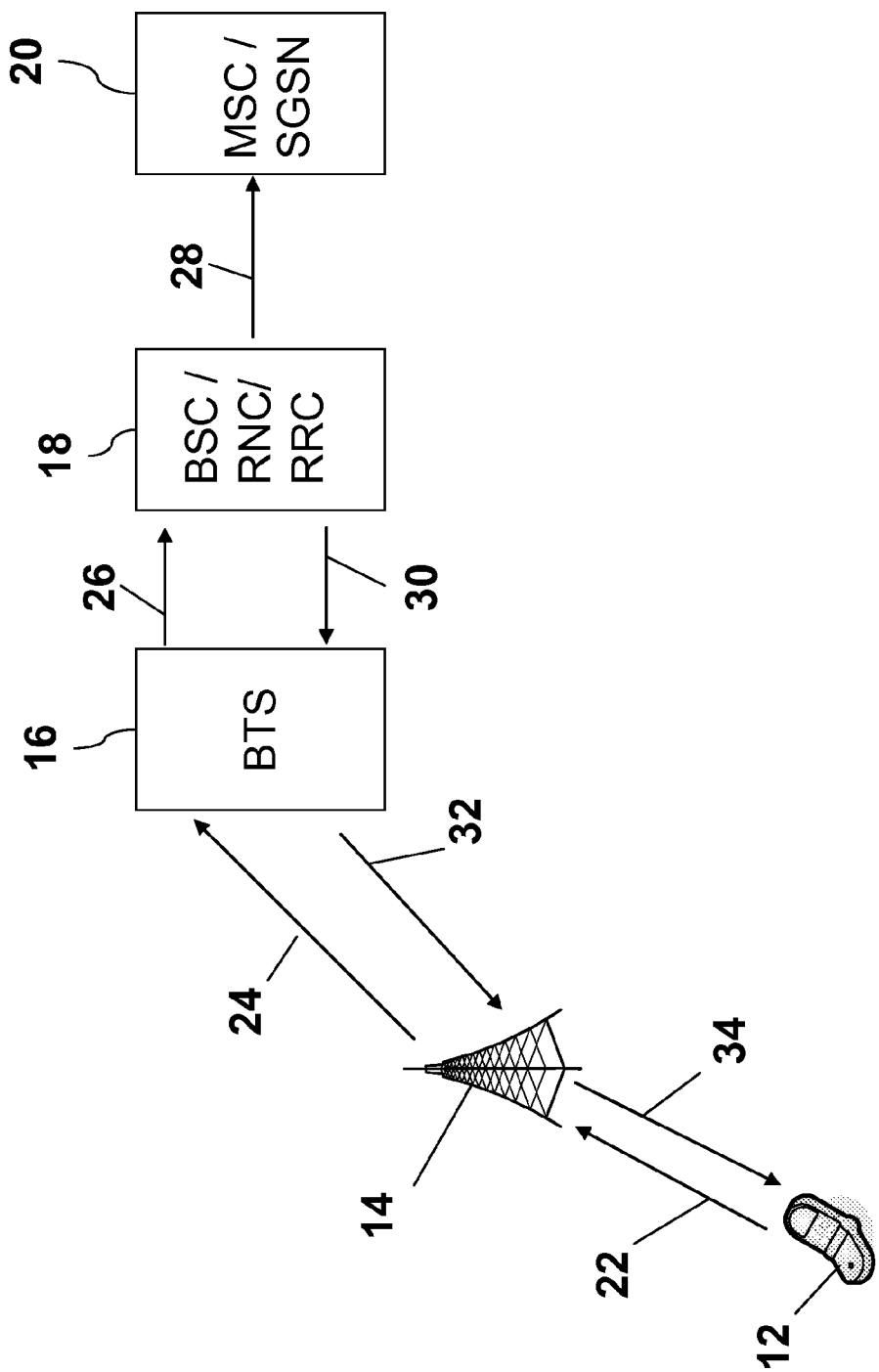
FIG. 1 is a diagram of an example system and process for managing preemptable communications resources.

FIG. 1 is a diagram of an example system and process for managing preemptable communications resources. At step 22, a mobile device 12 initiates a call and/or data session. The request to initiate the call/data session is provided via a wireless network equipment (e.g., towers and associated equipment) 14 to a base transceiver station (BTS) 16 at step 24. A BTS is an access point via which a mobile device (e.g., mobile device 12) can become connected to a wireless network. At step 26, the request is provided to a Base Station Controller (BSC), Radio Network Controller (RNC), and/or Radio Resource Control (RRC) 18. As described in more detail below, essentially, BSCs, RNCs, and RRCs handle control signaling, perform connection and release functions, and provide system configuration information.

In an example embodiment, the BSC/RNC/RRC 18 maintains a list/database of communications resources and attributes of each resource. Included in the attributes of each resource is an indication of the resource's preemptability (i.e., whether the resource is preemptable or not preemptable). For example, if a resource is part of the commercial portion of the shared spectrum, it could be deemed preemptable, and if a resource is part of the public safety portion of the shared spectrum, it could be deemed not preemptable. The BSC/RNC/RRC 18 can maintain a list/database of channels in the shared spectrum comprising the availability of each channel (e.g., it a channel is currently in use or not), channel parameters (e.g., transmission characteristics), connection path parameters, and an indication of the preemptability of each channel (e.g., whether each channel is preemptable or not preemptable). When the BSC/RNC/RRC 18 receives the request to initiate a call/data session, the BSC/RNC/RRC 18 queries the list and analyzes the resources and attributes to determine which resources to allocate and assign to the requester. For example, if the request is coming from a commercial user, the BSC/RNC/RRC 18 can analyze the list of resources, including resources that are preemptable. If the request is coming from a public safety user, the BSC/RNC/RRC 18 can analyze the list of resources, excluding resources that are preemptable.

In an example embodiment, the BSC/RNC/RRC 18 can analyze the list of resources in order to determine which resource to allocate and assign to the requester, including preemptable resources that are being utilized by users having a lesser priority than the requester. For example, if the initiator requesting to initiate a call/data session is a public safety user having a high priority, the BSC/RNC/RRC 18 can analyze its database for allocation and assignment to the requester, all resources not in use, all resources being used by commercial users, and resources being utilized by public safety users having a lesser priority than the requester's priority. Accordingly, in an example embodiment, the BSC/RNC/RRC 18 determines if the requester is authorized to preempt another user. An authorized requester can comprise any appropriate requester authorized to preempt another user. In an example embodiment, an authorized requester is a public safety user attempting to preempt a commercial user, an authorized requester is a public safety user having a first priority and attempting to preempt a public safety user having a second priority wherein the first priority is higher than the second priority or a combination thereof.

At step 28, the BSC/RNC/RRC 18 provides an indication of the resource allocation and assignment (e.g., channel assignment), including the indication of preemptability status to the call/session controller 20. In an example embodiment, the call/session controller 20 comprises a Mobile Switching Center (MSC) and/or a Service GPRS Support Node (SGSN). Typically, the MSC is utilized for voice and the SGSN is utilized for data. The call/session controller 20 will utilize the information provided by the BSC/RNC/RRC 18 to preempt resources as needed.

At step 30, the BSC/RNC/RRC 18 provides the indication of resource allocation and assignment (e.g., channel selected for the requester) to the BTS 16. At steps 32 and 34, the BTS 16 provides the indication of resource allocation and assignment to the mobile device 12 via the wireless network equipment 14. In an example embodiment, the BSC/RNC/RRC 18 provides the mobile device an indication that the allocated resource (e.g., the channel assigned to the requester) is a preemptable resource. Thus, the requester knows that the resource could be preempted in the case of an emergency or the like.

An event that can cause a resource to be preempted can be any appropriate event. For example, the event can be a natural disaster, an emergency, police activity, fire department activity, or the like. For example, a police officer may want to transmit real time video of a crime. Because the police officer does not want the transmission to be preempted, the police officer would request that the channel be non-preemptable. Upon receiving the request, the BSC/RNC/RRC 18 will determine if the police office is authorized to request non-preemption and if so, update the database to indicate that the channel the police officer is currently using is non-preemptable. If the real time transmission of the crime as it is occurring, requires more bandwidth than is currently allocated to the police officers mobile device, the BSC/RNC/RRC 18 and call/session controller 20, can preempt a preemptable user, and reallocate the preempted resource to the police officer for transmitting the real-time video. As another example, first responders and other emergency personnel may require non-preemptability status for channels in the case of a predicted meteorological event, such as a tornado or hurricane.

Figure 2:
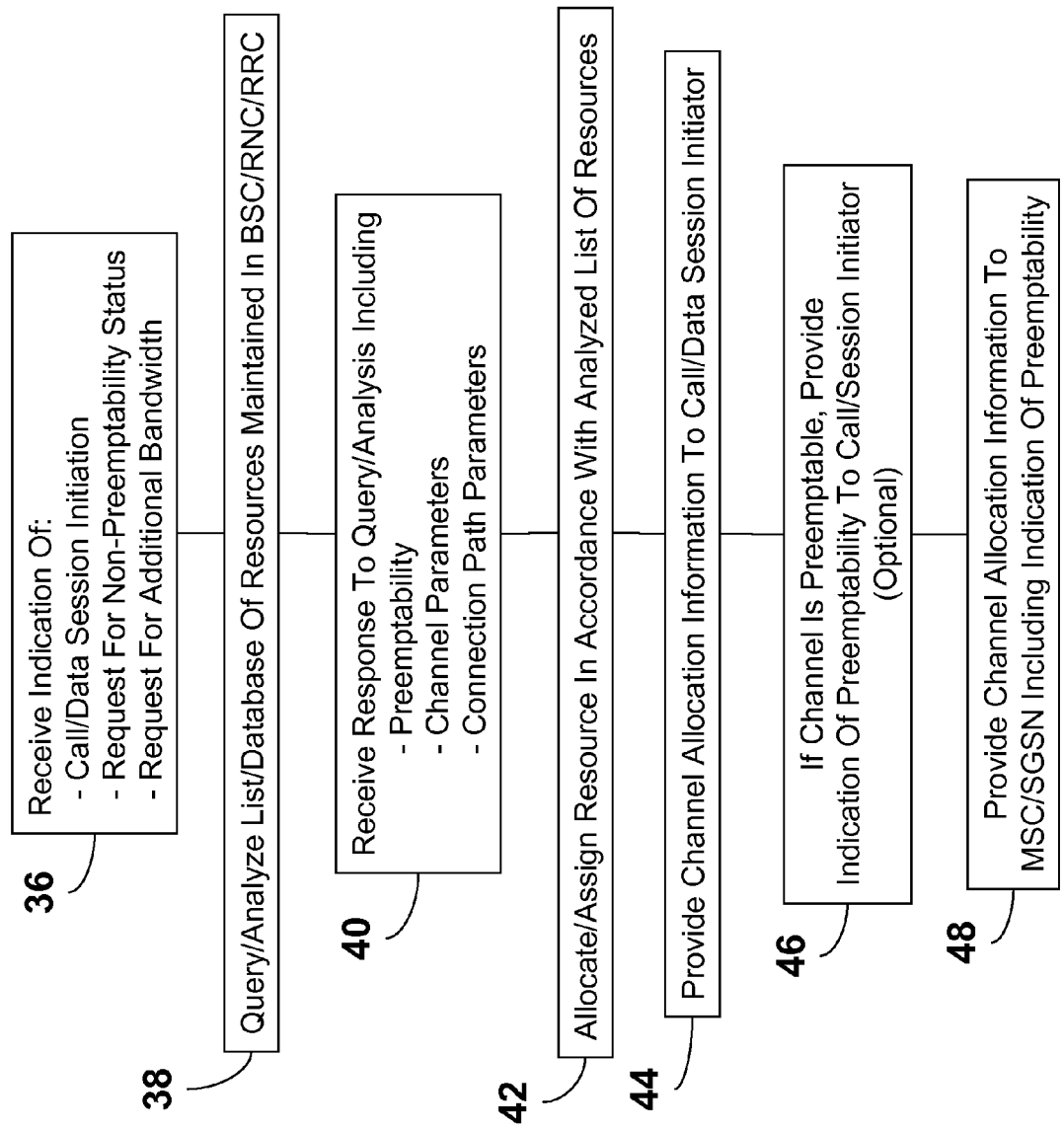
FIG. 2 is a flow diagram of an example process for managing preemptable communications resources.

FIG. 2 is a flow diagram of an example process for managing preemptable communications resources. An indication of a request for a communications resource is received at step 36. The indication of a request for a communications resource can comprise, for example, an indication that a call and/or data session is to be initiated, an indication of a request for non-preemptability status (or change of preemptability status), an indication of a request for additional bandwidth, or a combination thereof. In response to receiving the indication, at step 38, a database of communications resources is queried and analyzed. Each resource in the database includes an indication of the preemptability of the resource. For example, in an example embodiment, if the resource is a channel in the commercial portion of the shared spectrum, the indication of preemptability status for that resource would that the channel is preemptable unless that channel has been assigned to public safety usage when additional resources outside of the public safety primary spectrum is needed. As described above, the list of resources can be maintained in a BSC, RNC, and/or a RRC. It is to be understood however, that the list of resources can be maintained in any appropriate processor and/or database. A response to the query is received at step 40. In an example embodiment, the response includes information about communications resources including preemptability of a resource, resource parameters (e.g. channel parameters), and/or connection path parameters. At step 42, a resource, or resources, is allocated and/or assigned to the requester. As described above, resources are allocated/assigned in accordance with the user of a resource, if a resource is currently in use, the preemptability of the user, the preemptability of the resource, or a combination thereof. At step 44, the resource allocation and assignment information is provided to the call/data session initiator and/or requester. At step 46, optionally, if the resource and/or user is preemptable, an indication that the resource and/or user is preemptable is provided to the call/data session initiator. At step 48, the resource allocation and assignment information is provided to the call/session controller (e.g., MSC and/or SGSN) for connectivity and switching purposes.

In an example embodiment, if the initiator/requester is a commercial entity, the communications resources allocated and assigned to the commercial entity can be marked as preemptable. In another example embodiment, if the initiator/requester is a public safety entity, the communications resources allocated and assigned to the public safety entity can be marked as non-preemptable. In yet another example embodiment, if an indication of a request for additional resources is received (step 36), if the requester is authorized to make such a request (e.g., a public safety entity), preemptable resources are obtained, such as resources from a preemptable entity (e.g., a commercial entity), and the additional resources are provided to the requester. The provided resources will be marked as non-preemptable while being utilized by the authorized entity. When the need for the additional resources subsides, the reallocated resources will be made available to commercial users and marked as preemptable.

The mobile device 12 is representative of any appropriate type of mobile device such as for example, a portable device, a variety of computing devices including a portable media player, e.g., a portable music player, such as an MP3 player, a Walkman, etc., a portable computing device, such as a laptop, a personal digital assistant ("PDA"), a portable phone, such as a cell phone or the like, a smart phone, a Session Initiation Protocol (SIP) phone, a video phone, a portable email device, a thin client, a portable gaming device, etc., consumer electronic devices, such as TVs, DVD players, set top boxes, monitors, displays, etc., a public computing device, such as a kiosk, a non-conventional computing device, such as a kitchen appliance, a motor vehicle control (e.g., steering wheel), etc., biometric sensors, radiological sensors, chemical sensors, biological sensors, or a combination thereof.

Figure 3:
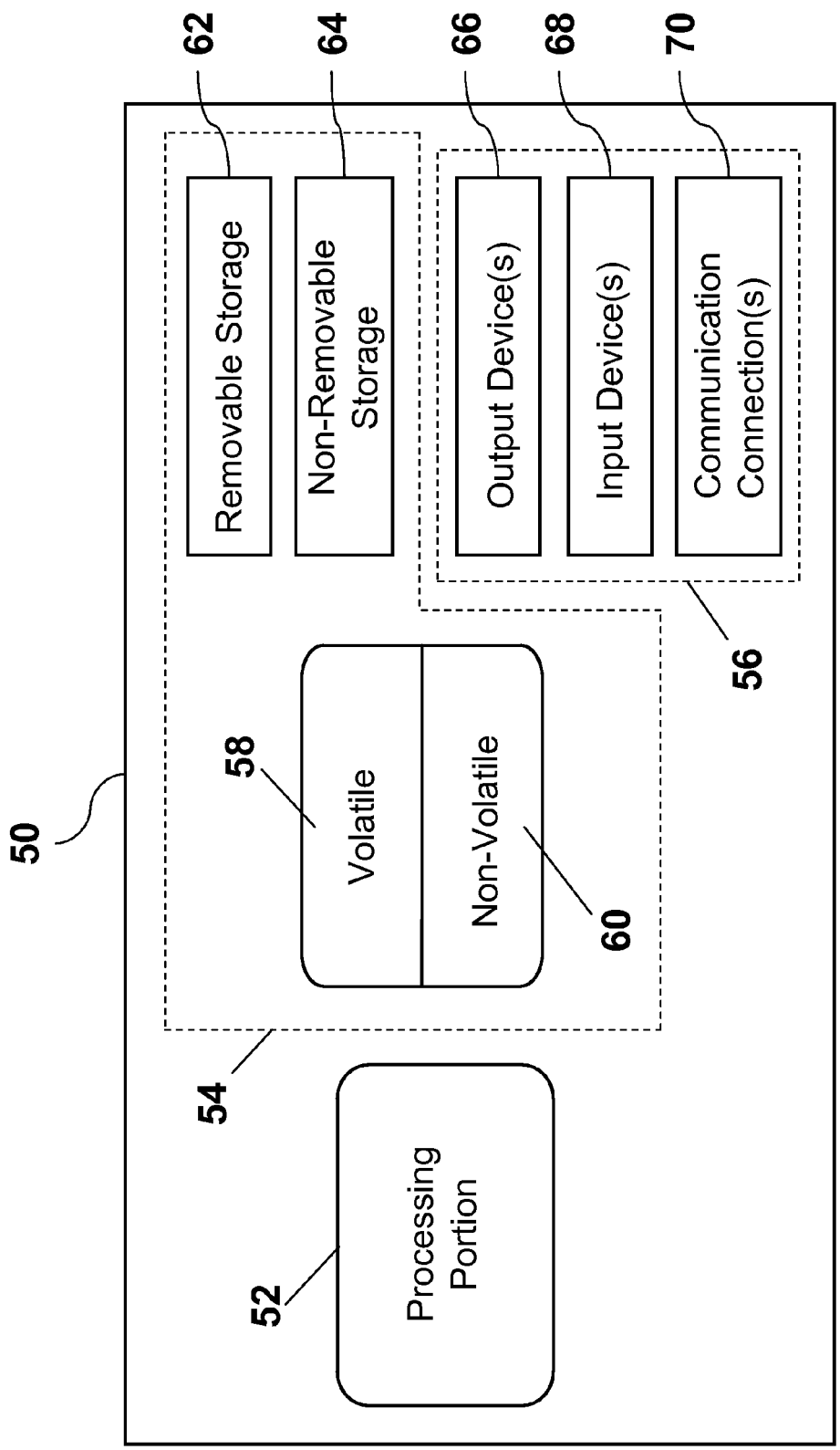
FIG. 3 is a block diagram of an example processor for managing preemptable communications resources.

FIG. 3 is a block diagram of an example processor 50 for managing preemptable communications resources. In an example configuration, the processor 50 comprises the BTS 16, the BSC/RNC/RRC 18, the MSC/SGSN 20, various appropriate components of the wireless network equipment 14, or a combination thereof. It is emphasized that the block diagram depicted in FIG. 3 is exemplary and not intended to imply a specific implementation. Thus, the processor 50 can be implemented in a single processor or multiple processors. Multiple processors can be distributed or centrally located. Multiple processors can communicate wirelessly, via hard wire, or a combination thereof.

The processor 50 comprises a processing portion 52, a memory portion 54, and an input/output portion 56. The processing portion 52, memory portion 54, and input/output portion 56 are coupled together (coupling not shown in FIG. 3) to allow communications therebetween. The input/output portion 56 is capable of providing and/or receiving components utilized to manage preemptable communications resources as described above. For example, as described above, the input/output portion 56 is capable of providing/receiving a request to initiate a call/data session, a request to change preemptability status, a request for non-preemptability status, a query to a database of resources, a response to a query to a database of resources, information pertaining to allocation and assignment of resources, an indication that a resource is preemptable, an indication that a resource is not preemptable, resource attributes, a query for determining an authorized user, a query for determining potentially preemptable users, a query for determining potentially preemptable resources, information indicative of a priority of the user, information indicative of a user being public safety user, information indicative of a user being public safety user or a commercial user, or a combination thereof. The processing portion 52 is capable of, as described above, determining if a user/requester is authorized, determining a priority of a user, determining if a user is preemptable, determining if a resource is preemptable, determining if a resource is being used, determining if a resource is not being used, selecting a resource, allocating a resource, assigning a resource, updating preemptability status, or a combination thereof.

The processor 50 can be implemented as a client processor and/or a server processor. In a basic configuration, the processor 50 can include at least one processing portion 52 and memory portion 54. The memory portion 54 can store any information utilized in conjunction with managing preemptable communications resources. For example, as described above, the memory portion 54 is capable of storing a list of resources and attributes of each resource including preemptability, a list of authorized users/requesters, a list of users of potentially available bandwidth, messages to be sent to users, a list of preempted users, predetermined priorities of users, information indicative of whether a user is a public safety user or a commercial user, or a combination thereof. Depending upon the exact configuration and type of processor, the memory portion 54 can be volatile (such as RAM) 58, non-volatile (such as ROM, flash memory, etc.) 60, or a combination thereof. The processor 50 can have additional features/functionality. For example, the processor 50 can include additional storage (removable storage 62 and/or non-removable storage 64) including, but not limited to, magnetic or optical disks, tape, flash, smart cards or a combination thereof. Computer storage media, such as memory portion 54, 58, 60, 62, and 64, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 50. Any such computer storage media can be part of the processor 50.

The processor 50 also can contain communications connection(s) 70 that allow the processor 50 to communicate with other devices, for example. Communications connection(s) 70 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. The processor 50 also can have input device(s) 68 such as keyboard, mouse, pen, voice input device, touch input device, etc. Output device(s) 66 such as a display, speakers, printer, etc. also can be included.

The following description sets forth some exemplary telephony radio networks and non-limiting operating environments in which management of preemptable communications resources can be implemented. The below-described operating environments should be considered non-exhaustive, however, and thus the below-described network architectures merely show how management of preemptable communications resources can be incorporated into existing network structures and architectures. It can be appreciated, however, that management of preemptable communications resources can be incorporated into existing and/or future alternative architectures for communication networks as well.

The global system for mobile communication ("GSM") is a widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of managing preemptable communications resources can be applied independently of the method for data transport, and do not depend on any particular network architecture, or underlying protocols.

Figure 4:
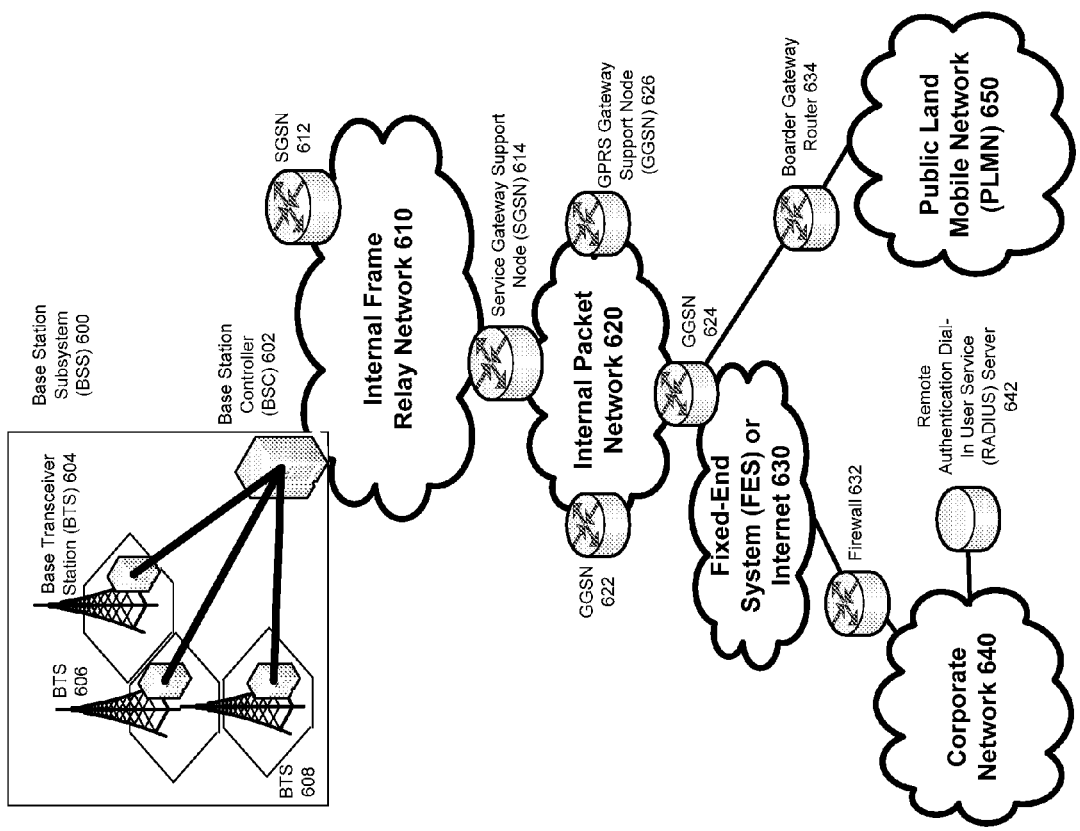
FIG. 4 depicts an overall block diagram of an exemplary packet-based mobile cellular network environment, such as a GPRS network, in which management of preemptable communications resources can be practiced.

FIG. 4 depicts an overall block diagram of an exemplary packet-based mobile cellular network environment, such as a GPRS network, in which managing preemptable communications resources can be practiced. In an example configuration, the wireless radio network 46 and cellular radio network and towers 44 are encompassed by the network environment depicted in FIG. 4. In such an environment, there are a plurality of Base Station Subsystems ("BSS") 600 (only one is shown), each of which comprises a Base Station Controller ("BSC") 602 serving a plurality of Base Transceiver Stations ("BTS") such as BTSs 604, 606, and 608. BTSs 604, 606, 608, etc. are the access points where users of packet-based mobile devices (e.g., mobile device 12) become connected to the wireless network. In exemplary fashion, the packet traffic originating from user devices (e.g., user device 42) is transported via an over-the-air interface to a BTS 608, and from the BTS 608 to the BSC 602. Base station subsystems, such as BSS 600, are a part of internal frame relay network 610 that can include Service GPRS Support Nodes ("SGSN") such as SGSN 612 and 614. Each SGSN is connected to an internal packet network 620 through which a SGSN 612, 614, etc. can route data packets to and from a plurality of gateway GPRS support nodes (GGSN) 622, 624, 626, etc. As illustrated, SGSN 614 and GGSNs 622, 624, and 626 are part of internal packet network 620. Gateway GPRS serving nodes 622, 624 and 626 mainly provide an interface to external Internet Protocol ("IP") networks such as Public Land Mobile Network ("PLMN") 650, corporate intranets 640, or Fixed-End System ("FES") or the public Internet 630. As illustrated, subscriber corporate network 640 may be connected to GGSN 624 via firewall 632; and PLMN 650 is connected to GGSN 624 via border gateway router 634. The Remote Authentication Dial-In User Service ("RADIUS") server 642 may be used for caller authentication when a user of a mobile cellular device calls corporate network 640.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 5:
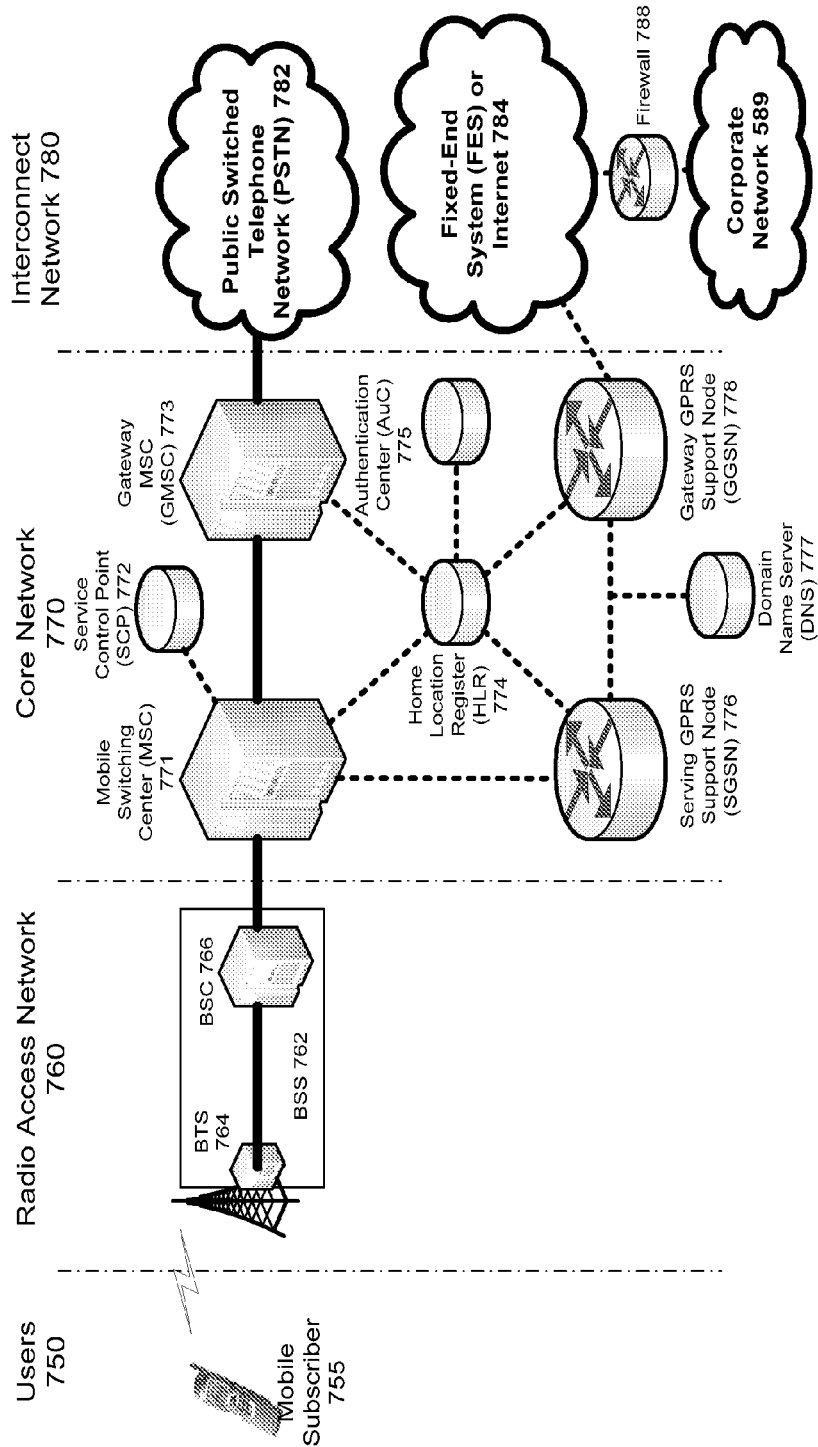
FIG. 5 illustrates an architecture of a typical GPRS network in which management of preemptable communications resources can be practiced.

FIG. 5 illustrates an architecture of a typical GPRS network as segmented into four groups: users 750, radio access network 760, core network 770, and interconnect network 780. In an example configuration the cellular and wireless networks 44, 46 are encompassed by the radio access network 760, core network 770, and interconnect network 780. Users 750 comprise a plurality of end users (though only mobile subscriber 755 is shown in FIG. 5). In an example embodiment, the device depicted as mobile subscriber 755 comprises mobile device 12. Radio access network 760 comprises a plurality of base station subsystems such as BSSs 762, which include BTSs 764 and BSCs 766. Core network 770 comprises a host of various network elements. As illustrated here, core network 770 may comprise Mobile Switching Center ("MSC") 771, Service Control Point ("SCP") 772, gateway MSC 773, SGSN 776, Home Location Register ("HLR") 774, Authentication Center ("AuC") 775, Domain Name Server ("DNS") 777, and GGSN 778. Interconnect network 780 also comprises a host of various networks and other network elements. As illustrated in FIG. 5, interconnect network 780 comprises Public Switched Telephone Network ("PSTN") 782, Fixed-End System ("FES") or Internet 784, firewall 788, and Corporate Network 789.

A mobile switching center can be connected to a large number of base station controllers. At MSC 771, for instance, depending on the type of traffic, the traffic may be separated in that voice may be sent to Public Switched Telephone Network ("PSTN") 782 through Gateway MSC ("GMSC") 773, and/or data may be sent to SGSN 776, which then sends the data traffic to GGSN 778 for further forwarding.

When MSC 771 receives call traffic, for example, from BSC 766, it sends a query to a database hosted by SCP 772.

The SCP 772 processes the request and issues a response to MSC 771 so that it may continue call processing as appropriate.

The HLR 774 is a centralized database for users to register to the GPRS network. HLR 774 stores static information about the subscribers such as the International Mobile Subscriber Identity ("IMSI"), subscribed services, and a key for authenticating the subscriber. HLR 774 also stores dynamic subscriber information such as the current location of the mobile subscriber. Associated with HLR 774 is AuC 775. AuC 775 is a database that contains the algorithms for authenticating subscribers and includes the associated keys for encryption to safeguard the user input for authentication.

In the following, depending on context, the term "mobile subscriber" sometimes refers to the end user (e.g., requester and sometimes to the actual portable device, such as the mobile device 12, used by an end user of the mobile cellular service. When a mobile subscriber turns on his or her mobile device, the mobile device goes through an attach process by which the mobile device attaches to an SGSN of the GPRS network. In FIG. 5, when mobile subscriber 755 initiates the attach process by turning on the network capabilities of the mobile device, an attach request is sent by mobile subscriber 755 to SGSN 776. The SGSN 776 queries another SGSN, to which mobile subscriber 755 was attached before, for the identity of mobile subscriber 755. Upon receiving the identity of mobile subscriber 755 from the other SGSN, SGSN 776 requests more information from mobile subscriber 755. This information is used to authenticate mobile subscriber 755 to SGSN 776 by HLR 774. Once verified, SGSN 776 sends a location update to HLR 774 indicating the change of location to a new SGSN, in this case SGSN 776. HLR 774 notifies the old SGSN, to which mobile subscriber 755 was attached before, to cancel the location process for mobile subscriber 755. HLR 774 then notifies SGSN 776 that the location update has been performed. At this time, SGSN 776 sends an Attach Accept message to mobile subscriber 755, which in turn sends an Attach Complete message to SGSN 776.

After attaching itself with the network, mobile subscriber 755 then goes through the authentication process. In the authentication process, SGSN 776 sends the authentication information to HLR 774, which sends information back to SGSN 776 based on the user profile that was part of the user's initial setup. The SGSN 776 then sends a request for authentication and ciphering to mobile subscriber 755. The mobile subscriber 755 uses an algorithm to send the user identification (ID) and password to SGSN 776. The SGSN 776 uses the same algorithm and compares the result. If a match occurs, SGSN 776 authenticates mobile subscriber 755.

Next, the mobile subscriber 755 establishes a user session with the destination network, corporate network 789, by going through a Packet Data Protocol ("PDP") activation process. Briefly, in the process, mobile subscriber 755 requests access to the Access Point Name ("APN"), for example, UPS.com (e.g., which can be corporate network 789 in FIG. 5) and SGSN 776 receives the activation request from mobile subscriber 755. SGSN 776 then initiates a Domain Name Service ("DNS") query to learn which GGSN node has access to the UPS.com APN. The DNS query is sent to the DNS server within the core network 770, such as DNS 777, which is provisioned to map to one or more GGSN nodes in the core network 770. Based on the APN, the mapped GGSN 778 can access the requested corporate network 789. The SGSN 776 then sends to GGSN 778 a Create Packet Data Protocol ("PDP") Context Request message that contains necessary information. The GGSN 778 sends a Create PDP Context Response message to SGSN 776, which then sends an Activate PDP Context Accept message to mobile subscriber 755.

Once activated, data packets of the call made by mobile subscriber 755 can then go through radio access network 760, core network 770, and interconnect network 780, in a particular fixed-end system or Internet 784 and firewall 788, to reach corporate network 789.

Thus, network elements that can invoke the functionality of managing preemptable communications resources can include but are not limited to Gateway GPRS Support Node tables, Fixed End System router tables, firewall systems, VPN tunnels, and any number of other network elements as required by the particular digital network.

Figure 6:
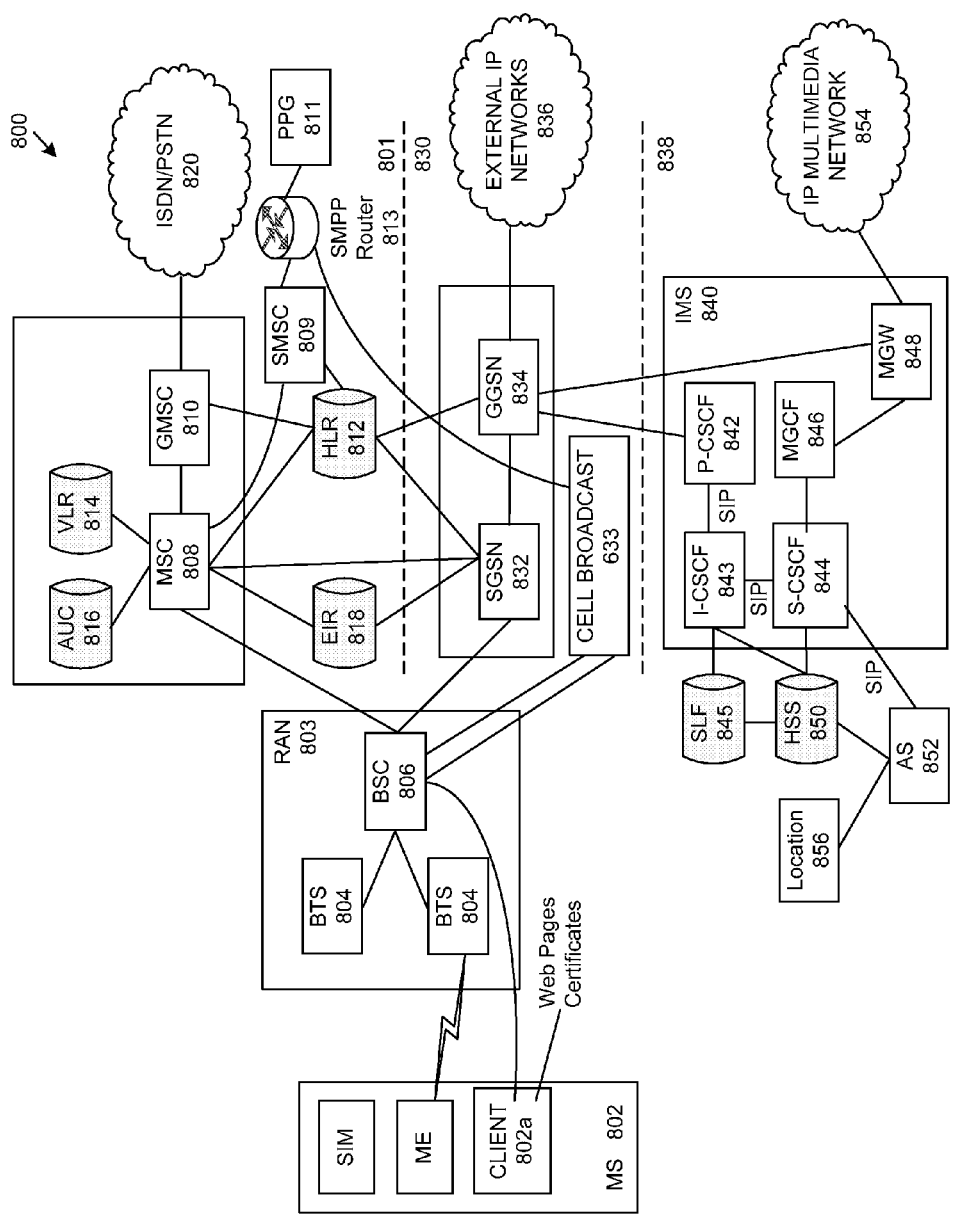
FIG. 6 illustrates an example alternate block diagram of an exemplary GSM/GPRS/IP multimedia network architecture in which management of preemptable communications resources can be incorporated.

FIG. 6 illustrates another exemplary block diagram view of a GSM/GPRS/IP multimedia network architecture 800 in which management of preemptable communications resources can be incorporated. As illustrated, architecture 800 of FIG. 6 includes a GSM core network 801, a GPRS network 830 and an IP multimedia network 838. The GSM core network 801 includes a Mobile Station (MS) 802, at least one Base Transceiver Station (BTS) 804 and a Base Station Controller (BSC) 806. The MS 802 is physical equipment or Mobile Equipment (ME), such as a mobile phone or a laptop computer (e.g., mobile device 12) that is used by mobile subscribers, with a Subscriber identity Module (SIM). The SIM includes an International Mobile Subscriber Identity (IMSI), which is a unique identifier of a subscriber. The BTS 804 is physical equipment, such as a radio tower, that enables a radio interface to communicate with the MS. Each BTS may serve more than one MS. The BSC 806 manages radio resources, including the BTS. The BSC may be connected to several BTSs. The BSC and BTS components, in combination, are generally referred to as a base station (BSS) or radio access network (RAN) 803.

The GSM core network 801 also includes a Mobile Switching Center (MSC) 808, a Gateway Mobile Switching Center (GMSC) 810, a Home Location Register (HLR) 812, Visitor Location Register (VLR) 814, an Authentication Center (AuC) 818, and an Equipment Identity Register (EIR) 816. The MSC 808 performs a switching function for the network. The MSC also performs other functions, such as registration, authentication, location updating, handovers, and call routing. The GMSC 810 provides a gateway between the GSM network and other networks, such as an Integrated Services Digital Network (ISDN) or Public Switched Telephone Networks (PSTNs) 820. Thus, the GMSC 810 provides interworking functionality with external networks.

The HLR 812 is a database that contains administrative information regarding each subscriber registered in a corresponding GSM network. The HLR 812 also contains the current location of each MS. The VLR 814 is a database that contains selected administrative information from the HLR 812. The VLR contains information necessary for call control and provision of subscribed services for each MS currently located in a geographical area controlled by the VLR. The HLR 812 and the VLR 814, together with the MSC 808, provide the call routing and roaming capabilities of GSM. The AuC 816 provides the parameters needed for authentication and encryption functions. Such parameters allow verification of a subscriber's identity. The EIR 818 stores security-sensitive information about the mobile equipment.

A Short Message Service Center (SMSC) 809 allows one-to-one Short Message Service (SMS) messages to be sent to/from the MS 802. A Push Proxy Gateway (PPG) 811 is used to "push" (i.e., send without a synchronous request) content to the MS 802. The PPG 811 acts as a proxy between wired and wireless networks to facilitate pushing of data to the MS 802. A Short Message Peer to Peer (SMPP) protocol router 813 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 802 sends a location update including its current location information to the MSC/VLR, via the BTS 804 and the BSC 806. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 830 is logically implemented on the GSM core network architecture by introducing two packet-switching network nodes, a serving GPRS support node (SGSN) 832, a cell broadcast and a Gateway GPRS support node (GGSN) 834. The SGSN 832 is at the same hierarchical level as the MSC 808 in the GSM network. The SGSN controls the connection between the GPRS network and the MS 802. The SGSN also keeps track of individual MS's locations and security functions and access controls.

A Cell Broadcast Center (CBC) 833 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 834 provides a gateway between the GPRS network and a public packet network (PDN) or other IP networks 836. That is, the GGSN provides interworking functionality with external networks, and sets up a logical link to the MS through the SGSN. When packet-switched data leaves the GPRS network, it is transferred to an external TCP-IP network 836, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 830 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 838 was introduced with 3GPP Release 5, and includes an IP multimedia subsystem (IMS) 840 to provide rich multimedia services to end users. A representative set of the network entities within the IMS 840 are a call/session control function (CSCF), a media gateway control function (MGCF) 846, a media gateway (MGW) 848, and a master subscriber database, called a home subscriber server (HSS) 850. The HSS 850 may be common to the GSM network 801, the GPRS network 830 as well as the IP multimedia network 838.

The IP multimedia system 840 is built around the call/session control function, of which there are three types: an interrogating CSCF (I-CSCF) 843, a proxy CSCF (P-CSCF) 842, and a serving CSCF (S-CSCF) 844. The P-CSCF 842 is the MS's first point of contact with the IMS 840. The P-CSCF 842 forwards session initiation protocol (SIP) messages received from the MS to an SIP server in a home network (and vice versa) of the MS. The P-CSCF 842 may also modify an outgoing request according to a set of rules defined by the network operator (for example, address analysis and potential modification).

The I-CSCF 843, forms an entrance to a home network and hides the inner topology of the home network from other networks and provides flexibility for selecting an S-CSCF. The I-CSCF 843 may contact a subscriber location function (SLF) 845 to determine which HSS 850 to use for the particular subscriber, if multiple HSS's 850 are present. The S-CSCF 844 performs the session control services for the MS 802. This includes routing originating sessions to external networks and routing terminating sessions to visited networks. The S-CSCF 844 also decides whether an application server (AS) 852 is required to receive information on an incoming SIP session request to ensure appropriate service handling. This decision is based on information received from the HSS 850 (or other sources, such as an application server 852). The AS 852 also communicates to a location server 856 (e.g., a Gateway Mobile Location Center (GMLC)) that provides a position (e.g., latitude/longitude coordinates) of the MS 802.

The HSS 850 contains a subscriber profile and keeps track of which core network node is currently handling the subscriber. It also supports subscriber authentication and authorization functions (AAA). In networks with more than one HSS 850, a subscriber location function provides information on the HSS 850 that contains the profile of a given subscriber.

The MGCF 846 provides interworking functionality between SIP session control signaling from the IMS 840 and ISUP/BICC call control signaling from the external GSTN networks (not shown). It also controls the media gateway (MGW) 848 that provides user-plane interworking functionality (e.g., converting between AMR- and PCM-coded voice). The MGW 848 also communicates with other IP multimedia networks 854.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of managing preemptable communications resources have been described in connection with various computing devices, the underlying concepts can be applied to any computing device or system capable of implementing management of preemptable communications resources. The various techniques described herein can be implemented in connection with hardware or software or, where appropriate, with a combination of both. Thus, the methods and apparatus for managing preemptable communications resources, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for managing preemptable communications resources. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus for managing preemptable communications resources also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for managing preemptable communications resources. When implemented on a general-purpose processor, the program code combines with the processor to provide a unique apparatus that operates to invoke the functionality of managing preemptable communications resources. Additionally, any storage techniques used in connection with managing preemptable communications resources can invariably be a combination of hardware and software.

While managing preemptable communications resources have been described in connection with the various embodiments of the various figures, it is to be understood that other similar embodiments can be used or modifications and additions can be made to the described embodiment for performing the same function of managing preemptable communications resources without deviating therefrom. For example, one skilled in the art will recognize that a system for managing preemptable communications resources as described may apply to any environment, whether wired or wireless, and may be applied to any number of devices connected via a communications network and interacting across the network. Therefore, managing preemptable communications resources should not be limited to any single embodiment, but rather should be construed in breadth and scope in accordance with the appended claims.

What is claimed is:

1. A method comprising:
   receiving an indication of a request for a communications resource;
   determining a type of a source of the request, the type of the source comprising one of a commercial user or a public safety user;
   analyzing a database of communications resources based on the type of the source, wherein:
      when the type of the source comprises a commercial user, analyzing the database for resources associated with a commercial user; and
      when the type of the source comprises a public safety user, analyzing the database for resources associated with a public safety user, the communications resources comprising:
         shared communications resources that are designated as being shared by public safety users and commercial user; and
         communications resources that are not shared, wherein the database concurrently comprises:
            a predetermined indication of preemptability status for each communications resource therein;
            a first indication that at least one shared communications resource of the database of communications resources is assigned to a commercial user and is preemptable; and
            a second indication that at least one shared communications resource of the database of communications resources is assigned to a public safety user and is not preemptable; and
   allocating a communications resource from the database of resources in accordance with the analyzing.

2. The method in accordance with claim 1, wherein the request for a communications resource comprises at least one of:
   a request to initiate a call session;
   a request to initiate a data session;
   a request for non-preemptability status of a resource;
   a request to change preemptability status of a resource; or
   a request for additional bandwidth.

3. The method in accordance with claim 1, wherein the method is performed by a processor.

4. The method in accordance with claim 1, further comprising updating a preemptability status of an allocated communications resource.

5. The method in accordance with claim 1, wherein the database is in at least one of a base station controller of a communications network, a radio network controller of a communications network, or a radio resource control of a communications network.

6. The method in accordance with claim 1, wherein the allocated communications resource is a preemptable resource and is allocated in response to an occurrence of an event, the method further comprising:
   updating the database to indicate that the allocated resource is not preemptable during the event; and
   updating the database to indicate that the allocated resource is preemptable when the event subsides.

7. The method in accordance with claim 1, further comprising providing an indication of the allocated communications resource to at least one of a mobile switching center of a communications network or a packet data service support node of a communications network.

8. A system comprising:
a processor; and
memory coupled to the processor, the memory comprising executable instructions that when executed by the processor cause the processor to effectuate operations comprising:
receiving an indication of a request for a communications resource; and
determining a type of a source of the request, the type of the source comprising one of a commercial user or a public safety user;
analyzing a database of communications resources based on the type of the source, wherein:
when the type of the source comprises a commercial user, analyzing the database for resources associated with a commercial user; and
when the type of the source comprises a public safety user, analyzing the database for resources associated with a public safety user,
the communications resources comprising:
shared communications resources that are designated as being shared by public safety users and commercial user; and
communications resources that are not shared, the database concurrently comprising:
a predetermined indication of preemptability status for each communications resource therein;
a first indication that at least one shared communications resource of the database of communications resources is assigned to a commercial user and is preemptable; and
a second indication that at least one shared communications resource of the database of communications resources is assigned to a public safety user and is not preemptable; and
allocating a communications resource from the database of resources in accordance with the analyzing.

9. The system in accordance with claim 8, wherein the request for a communications resource comprises at least one of:
a request to initiate a call session;
a request to initiate a data session;
a request for non-preemptability status of a resource;
a request to change preemptability status of a resource; or
a request for additional bandwidth.

10. The system in accordance with claim 8, the operations further comprising updating a preemptability status of an allocated communications resource.

11. The system in accordance with claim 8, wherein the database is maintained in at least one of a base station controller of a communications network, a radio network controller of a communications network, or a radio resource control of a communications network.

12. The system in accordance with claim 8, wherein the allocated communications resource is a preemptable resource and is allocated in response to an occurrence of an event, the operations further comprising:
updating the database to indicate that the allocated resource is not preemptable during the event; and
updating the database to indicate that the allocated resource is preemptable when the event subsides.

13. The system in accordance with claim 8, the operations further comprising providing the indication of an allocation of a preemptable communications resource to at least one of a mobile switching center of a communications network or a packet data service support node of a communications network.

14. A computer-readable storage medium, the computer-readable storage medium not being a transient signal, the computer-readable storage medium having stored thereon computer-executable instructions for causing a processor to effectuate operations comprising:
receiving an indication of a request for a communications resource;
determining a type of a source of the request, the type of the source comprising one of a commercial user or a public safety user;
analyzing a database of communications resources based on the type of the source, wherein:
when the type of the source comprises a commercial user, analyzing the database for resources associated with a commercial user; and
when the type of the source comprises a public safety user, analyzing the database for resources associated with a public safety user, the communications resources comprising:
shared communications resources that are designated as being shared by public safety users and commercial user; and
communications resources that are not shared, wherein the database concurrently comprises:
a predetermined indication of preemptability status for each communications resource therein;
a first indication of preemptability status for each communications resource therein;
an indication that at least one shared communications of the database of communications resources resource is assigned to a commercial user and is preemptable; and
a second indication that at least one shared communications resource of the database of communications resources is assigned to a public safety user and is not preemptable; and
allocating a communications resource from the database of resources in accordance with the analyzing.

15. The computer-readable storage medium in accordance with claim 14, wherein the request for a communications resource comprises at least one of:
a request to initiate a call session;
a request to initiate a data session;
a request for non-preemptability status of a resource;
a request to change preemptability status of a resource; or
a request for additional bandwidth.

16. The computer-readable storage medium in accordance with claim 14, the operations further comprising updating a preemptability status of an allocated communications resource.

17. The computer-readable storage medium in accordance with claim 14, wherein the allocated communications resource is a preemptable resource and is allocated in response to an occurrence of an event, the operations further comprising:
updating the database to indicate that the allocated resource is not preemptable during the event; and
updating the database to indicate that the allocated resource is preemptable when the event subsides.

18. The computer-readable storage medium in accordance with claim 14, the operations further comprising providing an indication of the allocated communications resource to at least one of a mobile switching center of a communications network or a packet data service support node of a communications network.

* * * * *